(12) United States Patent
Wang et al.

(10) Patent No.: US 11,625,281 B2
(45) Date of Patent: Apr. 11, 2023

(54) SERVERLESS PLATFORM REQUEST ROUTING

(71) Applicant: INTERNATIONAL BUSINESS MACHINES CORPORATION, Armonk, NY (US)

(72) Inventors: Yue Wang, Beijing (CN); Yue Chen, Beijing (CN); Wei ming He, Lian Yun Gang (CN); Huai Nan Zhou, Beijing (CN); Hui Gao, Beijing (CN); Yanfeng Shi, Beijing (CN); Hai Jun Xu, Beijing (CN); Wen Tao Zhang, Beijing (CN)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 383 days.

(21) Appl. No.: 16/780,654

(22) Filed: Feb. 3, 2020

(65) Prior Publication Data

US 2021/0240540 A1 Aug. 5, 2021

(51) Int. Cl.
*G06F 9/50* (2006.01)
*G06F 9/445* (2018.01)
*G06F 9/54* (2006.01)
*G06F 16/2458* (2019.01)

(52) U.S. Cl.
CPC ........ *G06F 9/5077* (2013.01); *G06F 9/44505* (2013.01); *G06F 9/54* (2013.01); *G06F 16/2474* (2019.01)

(58) Field of Classification Search
CPC ....... G06F 9/5077; G06F 9/44505; G06F 9/54
See application file for complete search history.

(56) References Cited

U.S. PATENT DOCUMENTS

| 8,788,569 B2 | 7/2014 | Griffiths et al. |
| 9,009,313 B2 | 4/2015 | Rice et al. |
| 10,824,726 B1* | 11/2020 | Herman Saffar ..... G06F 21/566 |
| 2014/0053150 A1* | 2/2014 | Barnett ............... G06F 9/45558 718/1 |

(Continued)

FOREIGN PATENT DOCUMENTS

CN 103841134 A 6/2014

OTHER PUBLICATIONS

"Welcome to Knative," [online] © 2020 The Knative Authors, retrieved Feb. 2, 2020, retrieved from the Internet <https://knative.dev/docs/>, 3 pg.

(Continued)

*Primary Examiner* — Dong U Kim
(74) *Attorney, Agent, or Firm* — Cuenot, Forsythe & Kim, LLC

(57) ABSTRACT

Routing containerized services requests on a serverless platform can include responding to receiving on the serverless platform a request for a containerized service and detecting a potential request failure. The response to the potential request failure can include searching a database that maps version-specific requests to a plurality of containers that are configured and managed by the serverless platform. The routing can include redirecting the request to a container containing a prior version of the containerized service requested in response to determining that the prior version of the containerized service maps to a version-specific request that matches the request received.

18 Claims, 9 Drawing Sheets

(56) References Cited

U.S. PATENT DOCUMENTS

| | | |
|---|---|---|
| 2015/0199197 A1 | 7/2015 | Maes et al. |
| 2016/0092250 A1* | 3/2016 | Wagner ............... G06F 9/44536 718/1 |
| 2017/0180346 A1* | 6/2017 | Suarez .................... G06F 21/53 |
| 2018/0373505 A1* | 12/2018 | Engquist ................... G06F 8/40 |
| 2020/0092194 A1* | 3/2020 | Tillotson ............... H04L 45/742 |
| 2021/0200814 A1* | 7/2021 | Tal ........................... G06F 8/63 |

OTHER PUBLICATIONS

"What is Kubernetes," [online] Copyright © 2020 The Kubernetes Authors, Documentation Distributed under CC BY 4.0, Copyright © 2020 The Linux Foundation ®, retrieved Feb. 2, 2020, retrieved from the Internet: <https://kubernetes.io/docs/concepts/overview/what-is-kubernetes/>, 4 pg.

Mell, P. et al., The NIST Definition of Cloud Computing, National Institute of Standards and Technology, U.S. Dept. of Commerce, Special Publication 800-145, Sep. 2011, 7 pg.

* cited by examiner

300

```
┌─────────────────────────────────────────────────┐
│ Responsive to receiving on a serverless         │
│ platform a request for a containerized service  │
│ and detecting a potential request failure,      │
│ search database that maps version-specific      │
│ requests to a plurality of containers           │
│ configured and managed by the serverless        │
│ platform                                        │
│                                                 │
│                      302                        │
└─────────────────────────────────────────────────┘
                        │
                        ▼
┌─────────────────────────────────────────────────┐
│ Redirect the request to a container containing  │
│ a prior version of the containerized service    │
│ requested in response to determining that the   │
│ container maps to a version-specific request    │
│ that matches the request received               │
│                                                 │
│                      304                        │
└─────────────────────────────────────────────────┘
```

SERVERLESS PLATFORM REQUEST ROUTING

BACKGROUND

This disclosure relates to containerized computer applications, and more particularly, to serverless computing.

Computer software applications increasingly are built using containers—discrete units of software in which microservices are packaged in combination with libraries, configurations, and dependencies in a manner that enables the software to run virtually anywhere whether on premises, at a third-party data center, or in a cloud-based computing environment. A container orchestration platform automates the deployment, scaling, and operations of application containers across a cluster of hosts and can operate with various container tools. Serverless computing can enhance a container orchestration platform and make cloud-native applications more efficient. Instead of deploying an on-going instance of software that sits idle while waiting for requests, serverless computing brings up the software only as needed. By scaling software up or down as demand fluctuates and then taking the software down when not in use, serverless computing can conserve computing capacity and power while reducing associated computing costs.

SUMMARY

In one or more embodiments, a method includes responding to receiving on a serverless platform a request for a containerized service and detecting a potential request failure by searching a database with computer hardware, the database mapping version-specific requests to a plurality of containers configured and managed by the serverless platform. The method also includes redirecting the request to a container containing a prior version of the containerized service requested in response to determining that the prior version of the containerized service maps to a version-specific request that matches the request received.

In one or more embodiments, a system includes a processor configured to initiate operations. The operations include responding to receiving on a serverless platform a request for a containerized service and detecting a potential request failure by searching a database, the database mapping version-specific requests to a plurality of containers configured and managed by the serverless platform. The operations also include redirecting the request to a container containing a prior version of the containerized service requested in response to determining that the prior version of the containerized service maps to a version-specific request that matches the request received.

In one or more embodiments, a computer program product includes a computer readable storage medium having instructions stored thereon. The instructions are executable by a processor to initiate operations. The operations include responding to receiving on a serverless platform a request for a containerized service and detecting a potential request failure by searching a database, the database mapping version-specific requests to a plurality of containers configured and managed by the serverless platform. The operations also include redirecting the request to a container containing a prior version of the containerized service requested in response to determining that the prior version of the containerized service maps to a version-specific request that matches the request received.

This Summary section is provided merely to introduce certain concepts and not to identify any key or essential features of the claimed subject matter. Other features of the inventive arrangements will be apparent from the accompanying drawings and from the following detailed description.

BRIEF DESCRIPTION OF THE DRAWINGS

The inventive arrangements are illustrated by way of example in the accompanying drawings. The drawings, however, should not be construed to be limiting of the inventive arrangements to only the particular implementations shown. Various aspects and advantages will become apparent upon review of the following detailed description and upon reference to the drawings.

FIG. 3 is a flowchart of a method for routing requests on a serverless platform according to an embodiment.

DETAILED DESCRIPTION

Figure 1:
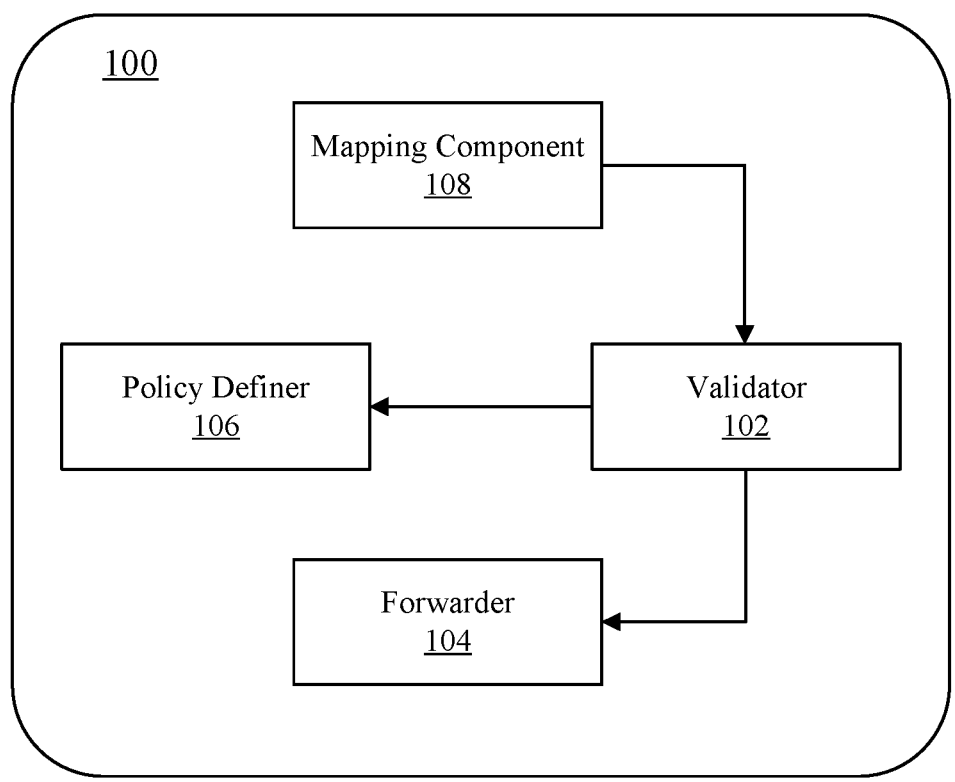
FIG. 1 depicts an example serverless platform routing system according to an embodiment.

While the disclosure concludes with claims defining novel features, it is believed that the various features described within this disclosure will be better understood from a consideration of the description in conjunction with the drawings. The process(es), machine(s), manufacture(s) and any variations thereof described herein are provided for purposes of illustration. Specific structural and functional details described within this disclosure are not to be interpreted as limiting, but merely as a basis for the claims and as a representative basis for teaching one skilled in the art to variously employ the features described in virtually any appropriately detailed structure. Further, the terms and phrases used within this disclosure are not intended to be limiting, but rather to provide an understandable description of the features described.

This disclosure relates to containerized computer applications, and more particularly, to serverless computing. Operating an application that spans multiple containers deployed across multiple servers can be a complex task. To assist in the task, a container orchestration platform provides software tools for deploying and managing containers at scale, thereby enabling developers to build, deliver, and manage containerized applications more efficiently.

A container orchestration engine facilitates both declarative configuration and automation of containerized workloads and services. An example of a container orchestration engine is Kubernetes. The container orchestration engine may be open source. The container orchestration engine is capable of automating distribution and scheduling of application containers across clusters, each of which includes nodes that run applications and a master that coordinates the cluster's nodes' activities. A node is a virtual machine (VM) or physical computer that serves as a "worker machine" having an agent (e.g., Kubernetes Kubelet) for managing the node and communicating with the master. Containerized applications can be deployed on top of a running cluster.

To host an application instance, the container orchestration engine can create a pod that groups containers that share computer system resources and the same network. The pod is an abstraction or "logical host" that represents a group of relatively tightly coupled application containers (e.g., Docker or rkt container) and the resources shared by the containers. The resources include shared storage ("volumes"), networking resources using a unique cluster IP address, and information such as container image version or specific ports used for running each container. Each pod is tied to the node where the pod is scheduled and remains there until termination (according to a restart policy) or deletion. In the event of a node failure, identical pods are scheduled on other available nodes within the cluster. A service (e.g., Kubernetes Service) is an abstraction that defines a logical set of pods and a policy by which to access the pods. Services enable a loose coupling between dependent pods and are defined using, for example, YAML or JSON, as are other objects. The container orchestration engine supports autoscaling of a deployment (e.g., Kubernetes Deployment) to ensure new pods are created and scheduled to nodes with available resources. Running multiple instances of an application requires that traffic is distributed to each application, and accordingly, a service can include an integrated load-balancer to distribute network traffic to all pods. With multiple instances of an application running, a developer can perform rolling updates without downtime.

As the number of containers related to an application increases, the number of possible connection paths between the containers escalates exponentially. The container orchestration platform deploys and manages containers but does not typically manage or automate routing between the containers, nor monitor, secure, or debug connections once established. Therefore, a service mesh layer can be added to a container orchestration platform to connect, manage, and secure networks of different microservices. An example of a service mesh is Istio. The service mesh may be open source. The service mesh can configure, monitor, and manage interactions between containers comprising a cluster. The service mesh allows a developer to set a single policy that configures connections between containers without having to configure each connection individually. The service mesh works natively with a container orchestration engine by adding an envoy—a per-microservice "sidecar" proxy container that handles ingress/egress traffic between microservices in a cluster and from a microservice to external services. Envoys configure, monitor, and manage interactions between containers to form a secure microservice mesh with a set of functions (e.g., discovery, layer-7 routing, circuit breakers, policy enforcement, and telemetry recording/reporting functions).

Containerizing code typically requires that a developer perform numerous repetitive tasks. For example, orchestrating containers requires a considerable amount of configuration and scripting (e.g., generating configuration files, installing dependencies, managing logging and tracing, and writing continuous integration/continuous deployment (CI/CD) scripts).

A serverless platform can assist a developer by automating such tasks. An example of a serverless platform is Knative. A serverless platform may be open source. A serverless platform build component (e.g., Knative Build) automatically transforms source code into a cloud native container or function by pulling the code from a repository, installing required dependencies, building the container image, and putting the image in a container registry for other developers to use. A developer needs merely to specify the location of these elements, and the serverless platform build component can locate the elements and automate the build. A service component (e.g., Knative Serve) runs containers as scalable services. A "configuration" feature of the serve component saves different versions of a container ("snapshots") every time a developer pushes another container version to production (different versions can run concurrently). A "service routing" feature of the serve component allows a developer to direct different amounts of traffic to different versions.

Using these features, a developer can gradually phase a container rollout or stage a canary test of a containerized application prior to putting the application into global production. An event component (e.g. Knative Event) of a serverless platform can enable specified events to trigger container-based services or functions. The serve component allows a developer to express "interest" in types of events and then responds by connecting to the event producer and routing the events to the container, thereby eliminating the need for the developer to program the connections. Additionally, community-maintained client libraries allow developers to write applications using a representational state transfer (REST) application programming interface (API), without needing to implement the REST API calls and request/response types manually.

Containerization coupled with serverless computing using a tool simplifies the process of developing software applications and, in doing so, facilitates frequent revisions of an application's containers. Developers typically need only concern themselves with code and configuration files. Developers can build, deploy and run application programs in a cloud environment, for example, without giving much if any attention to version control. By default, a system typically routes a client request for a containerized service to a container or container orchestration engine pod containing the latest version of the service.

The configuration for a service request (e.g., a REST API format created using open-source Swagger or similar such tool), however, may change between when container version n−1 (where n is any integer) is deployed and when container version n (referred to as "revision") is later deployed. A post-revision service request is automatically forwarded (by a gateway) to container version n. If the client request is made using an old API request rather than the newly configured API request, there may occur a request failure. As defined herein, "request failure" is the failure of an application to provide a service requested by a client owing to an inability to identify a container containing the correct version of the service requested or the pod associated with the container.

In accordance with the inventive arrangements disclosed herein, a potential request failure can be circumvented by searching a database that maps version-specific request configurations with containers containing prior versions of the containerized service. If the search reveals that a received request matches one based on a prior configuration or format that maps to an earlier version of the containerized service, the request can be redirected to the container of the correct version.

An aspect of the systems, methods, and computer program products disclosed herein is creation of a mapping of the content information of an API call with the container of a specific version (or revision) of a containerized service when a new version of the service is built using the build tool of a serverless computing platform. The mapping of a containerized service version identifier and corresponding API content information can be electronically stored (e.g., open-source etcd key-value store) as the service version is built by the serverless platform tool. If a latter revision is built, a call to the earlier version is redirected to the container or pod corresponding to the older version to prevent the failure of a client request for the older version of the containerized service. When a request is redirected, a corresponding routing policy can be automatically defined and stored for redirecting future requests to the correct container or pod.

In another aspect, if a received request for a service matches a request for an earlier version of the service, then the received request can be redirected by adding a revision version identifier to the request header's host field. If the redirected request fails to invoke the requested service, a different revision version identifier (e.g., to a still earlier version) can by added. The procedure can continue iteratively beginning with the most recent version until either the correct version is invoked or a predetermined retry limit is reached. If the correct version of a service is scaled to zero, the service can be re-scaled in order to meet the request.

The arrangements described herein are directed to computer technology and provide an improvement to computer technology. Specifically, the present arrangements improve the performance of a serverless platform by mitigating the probability of failure of a client request for an older version of a containerized service. Performance of the serverless platform is further enhanced by automatic creation of a routing policy to redirect all future requests for an older service version to the correct container, thereby mitigating waste of computing resources in repeated searches that fail to return a correct version of the requested containerized service.

Further aspects of the embodiments described within this disclosure are described in greater detail with reference to the figures below. For purposes of simplicity and clarity of illustration, elements shown in the figures have not necessarily been drawn to scale. For example, the dimensions of some of the elements may be exaggerated relative to other elements for clarity. Further, where considered appropriate, reference numbers are repeated among the figures to indicate corresponding, analogous, or like features.

Referring initially to FIG. 1, example system 100 for routing requests in the context of a serverless platform is depicted. System 100 illustratively includes validator 102, request forwarder 104, which is operatively coupled to validator 102, and policy definer 106, which also is operatively coupled to validator 102. In certain embodiments, system 100 is implemented as a set of computer system instructions (software) that execute on one or more processors such as processor(s) 916 of computer system 912 described with reference to FIG. 9. In other embodiments, however, system 100 can be implemented in dedicated circuitry or a combination of circuitry and software. System 100 operatively couples with or is integrated in a serverless platform that runs on top of a container orchestration engine for deploying and managing multiple containers that provide computer application microservices on one or more host machines. Optionally, system 100 includes mapping component 108, which also can be implemented in software, dedicated circuitry, or a combination of the two.

Figure 2:
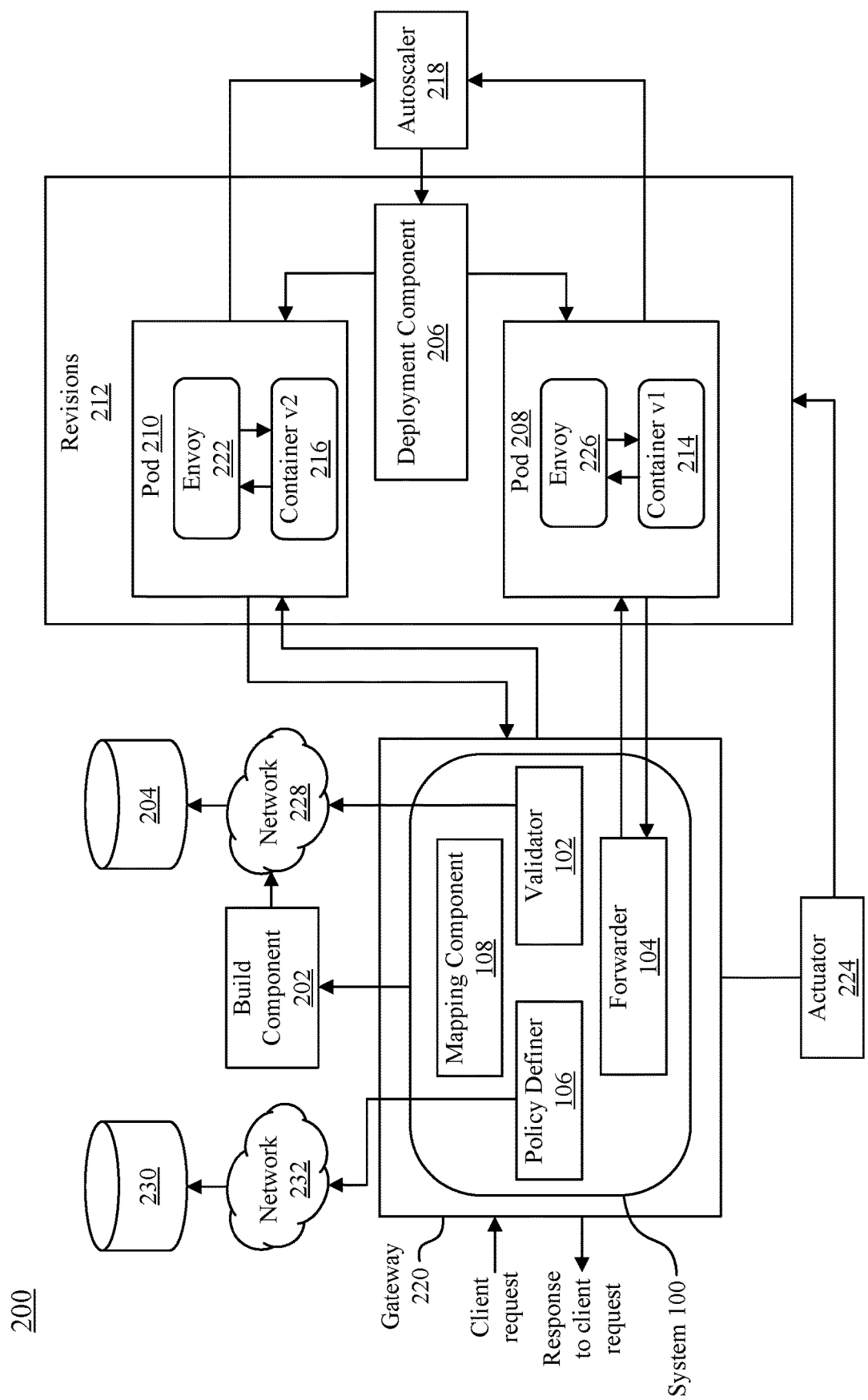
FIG. 2 depicts certain operative aspects of one embodiment of the example serverless platform routing system shown in FIG. 1.

Referring additionally to FIG. 2, certain operative aspects of one embodiment of system 100 operating in conjunction with serverless platform 200 are now described. Serverless platform 200 illustratively includes build component 202 that automatically transforms a developer's source code into a cloud-native container or function by pulling the code from a repository, installing required dependencies, building the container image, and storing the image in database 204 for other developers to use. Serverless platform 200 also illustratively includes deployment component 206, which creates pods that act as logical hosts for grouping relatively tightly coupled application containers (e.g., Docker or rkt containers) and the resources shared by the containers. Although only pod 208 and pod 210 (collectively revisions 212) are shown, it will be readily understood that serverless platform 200 can include any number of pods, the number constrained only by underlying limitations of the hardware supporting the platform. Moreover, although each pod can logically group multiple containers comprising microservices packaged in combination with libraries, configurations, and dependencies, only container 214 and container 216 are shown. Container 214 contains one version (or revision) of a containerized service, and container 216 contains a subsequent version (revision). Autoscaler 218 can scale the code implementing the microservices and collected in various containers up or down as demand fluctuates and then take down the code-implemented microservices when not in use.

System 100 can be operatively coupled to or integrated in gateway 220 of serverless platform 200. Serverless platform 200 can run on a container orchestration platform that includes a service mesh for configuring, monitoring, and managing interactions between containers. Gateway 220 (e.g., ingress gateway) can operate to expose services (implemented by microservices collected in containers) outside the service mesh. A client can access one or a group of microservices that collectively provide client services with a service request received at gateway 220. As defined herein, "service" refers to a data processing action or function performed by a computer according to and under the direction of code comprising cooperatively functioning microservices. Relatedly, "containerized service," as defined herein refers to a service performed by a collection of microservices logically grouped in a container.

A service can be invoked according to a specification that defines an interface to an API for calling the service. An example API specification is a Swagger specification. When a service undergoes one or more revisions—illustratively, revisions 212—and a user is unaware of a change in the API specification (e.g., Swagger file) associated with container 214 and container 216, there is the potential for request failure if the user submits a request using a prior configuration that is automatically sent to the container of the latest version of the containerized service. The following example Swagger APIs illustrate such a change by contrasting a prior Swagger API with a revision Swagger API:

---

Swagger API (prior):
/insts:
  post:
    operationId: "controllers.api.create_instance"
    parameters:

```
        - name: "instance_data"
          in: "body"
          required: true
          schema:
            type: "object"
            properties:
              inst_name:
                type: "string"
              server_number:
                type: "string"
        responses:
          200:
            description: "Success"
Swagger API (revision):
  /insts:
    post:
      operationId: "controllers.api.create_instance"
      parameters:
        - name: "instance data"
          in: "body"
          required: true
          schema:
            type: "object"
            properties:
              inst_name:
                type: "string"
              server_number:
                type: "integer"
        responses:
          200:
            description: "Success"
```

Illustratively, the Swagger API change occurs with respect to the server number type, which is changed in the revised API to "integer," whereas the prior format required a "string" type.

Gateway 220 automatically directs a request for a containerized service to the container containing the latest version of the service. System 100 operates in response to the generation of an error (e.g., a 400-designated error code) in response to the gateway-directed request, the error indicating a potential request failure. Validator 102 determines whether the request is valid but misdirected by determining whether the configuration or format of the received request matches the configuration or format of a version-specific request for a prior version of the service.

For example, gateway 220 illustratively directs a request to the more recently created container 216 via envoy 222, which returns a 400-designated error code along with a parameter type error information. Actuator 224 receives an inactive routing from gateway 220 in attempting to activate pod 208, thereby creating the potential for a request failure. System 100, however, operates to circumvent this type of error.

System 100, based on the returned error code, determines a potential request failure and responds by searching database 204. Validator 102 can determine whether the received request is valid, but misdirected, by determining whether the request format matches a version-specific request that corresponds to a prior version of the service. Constructed according to procedures detailed below, database 204 maps version-specific requests to prior versions of services hosted on serverless platform 200. If validator 102 identifies a match between the received request and a version-specific request that corresponds to a prior version, then the request is determined to be valid and the potential request failure can be avoided by redirecting the request. Thus, in response to validator 102 determining that the prior version of the service maps to a version-specific request that matches the user-submitted request, forwarder 104 activates pod 208 and, via envoy 226, redirects the user-submitted request to container 214 containing the prior version of the service.

Illustratively, database 204 is electronically stored on a networked server (e.g., Kubernetes® API server) that is communicatively coupled to system 100 and build component 202 via data communications network 228 (e.g., local area network, the Internet). In one aspect, database 204 is created by associating each version of a service with the service container's API definition file, which specifies the configuration for accessing the correct container in response to a service request for the specific version of the service. As each version is constructed, the corresponding API definition file is mapped to that version.

In certain embodiments, build component 202 is a Knative Build component that automatically transforms source code into a cloud native container or function by pulling code from a repository, installing required dependencies, building the container image, and putting the image in a container registry. In accordance with this embodiment, a path property (e.g., Swagger path) is added to each Knative revision setting. As defined herein, "path property" is a specification for locating a file containing the interface definition information specifying the configuration of an API call for invoking a specific version of a service.

Mapping component 108 operatively couples to build component 202. As build component 202 creates a version (or revision) of a containerized service, mapping component 108 maps the interface definition information specifying the configuration of an API call for invoking that specific version of the service to a corresponding container version identifier. The mapping component 108 can thus map a request (according to a specific configuration or format) to a specific version of containerized service and corresponding container containing the specific version. The mapping of the interface definition information to the corresponding container version identifier is electronically stored in database 204. In one embodiment, database 204 is an etcd distributed key-value store accessed through an API server communicatively linked to system 100 via data communications network 228.

The path property added into a Knative revision setting is used to locate the Swagger definition file. If the Swagger definition file is contained in a networked repository (e.g., GitHub-hosted repository), mapping component 108 can extract file content (interface definition information) from the extracted file. If the Swagger definition file is not contained in a networked repository, system 100 responds by automatically launching a container (e.g., Docker or rkt container) image to locate the Swagger definition file in the container and can extract file content from the extracted file. The following example code illustrates the use of Swagger path properties by mapping component 108 for obtaining the file content from a container image and repository, respectively:

```
apiVersion: serving.knative.dev/v1alpha1
kind: Configuration
metadata:
    name: blue-green-demo
    namespace: default
spec:
    revisionTemplate:
        metadata:
            labels:
                knative.dev/type: container
        spec:
            container:
```

```
        image:gcr.io/knative-samples/knative-route-demo:blue
        swagger_path: /var/apps/knative-samples/swagger/
definition.yaml
        imagePullPolicy: Always
        env:
           - name: T_VERSION
             value: "blue"
        ...
   spec:
      container:
         repository: git@github.com:knatvie/knative-samples.git
         swagger_path:swagger/definition.yaml
```

The revision created using build component 202 can be stored with API content information in an etcd file. Based on the information, validator 102 can determine whether, given a potential request failure, a service request is nonetheless valid by searching database 204 and determining that a prior version of the service maps to a version-specific request that matches a received request.

In certain embodiments, system 100 redirects a request by adding a revision version indicator to the request header's host field and attempting to invoke the service requested using the reconfigured request having the added revision version indicator. A prerequisite to the attempt to redirect the request is that the received request (e.g., corresponding to a Swagger definition of an API call) matches a version-specific request for a prior version of the service. That is, no attempt to invoke is made unless and until a search of the database mapping version-specific requests to containers reveals a version-specific request (e.g., (e.g., according to a Swagger definition) that matches the configuration or format of the received request. If the redirected request fails to invoke the requested service and there is an even earlier version of the service whose version-specific request also matches the format of the received request, then system 100 can add the earlier revision version indicator and make another attempt to invoke the service requested. The procedure can continue iteratively (e.g., corresponding to ever-earlier versions of the service) until either the correct version of the service is invoked or a predetermined retry limit is reached.

If the number of attempts reaches predetermined retry limit, system 100 can notify the client or user. The notification can comprise the error message generated when the gateway automatically directed the request to the most recently created container (e.g., a 400-designated error code returned along with a parameter type error information, as described above). Whenever a version of a service is scaled to zero, the service can be re-scaled in order to meet the request in response to successfully invoking the service before the retry limit is reached. If the correct version of the service is invoked successfully, then policy definer 106 is notified.

Policy definer 106 automatically defines a routing rule for redirecting all future requests that match the version-specific request to the container containing the version of the service that maps to the version-specific request identified by validator 102. The routing rule can be stored in database 230, which system 100 can access via data communications network 232 (the same as or different from data communications network 228). In certain embodiments, the routing rule is stored as a service mesh policy (e.g., an Istio Policy) in an etcd file.

FIG. 3 is a flowchart of example method 300 for routing requests on a serverless platform according to an embodiment. Method 300 can be implemented with a system the same or similar to the systems described with reference to FIGS. 1 and 2. Responsive to receiving on a serverless platform a request for a containerized service and detecting a potential request failure, the system at block 302 searches a database. The system can identify the potential request failure in response to detecting an error message (e.g., a 400-designated error code) automatically generated when a request is forwarded (e.g., by a gateway) to a container containing the most recently created version of the containerized service requested. For example, the request may automatically return a 400-designated error code with parameter type error information as described above. In response, the system determines whether the configuration (e.g., API format) of the received request matches the configuration specified for calling the latest version of the containerized service. If not, the request may be directed to a prior version of the containerized service requested. To make the determination, the system searches a database that maps version-specific requests to a plurality of containers configured and managed by the serverless platform, each container containing a specific version of a containerized service. The system at 304 redirects the request received to a container containing a prior version of the containerized service requested in response to determining that the container maps to a version-specific request that matches the request received.

The system optionally can generate and electronically store a routing rule that redirects future requests matching the request received to the container containing the prior version of the containerized service.

Figure 4:
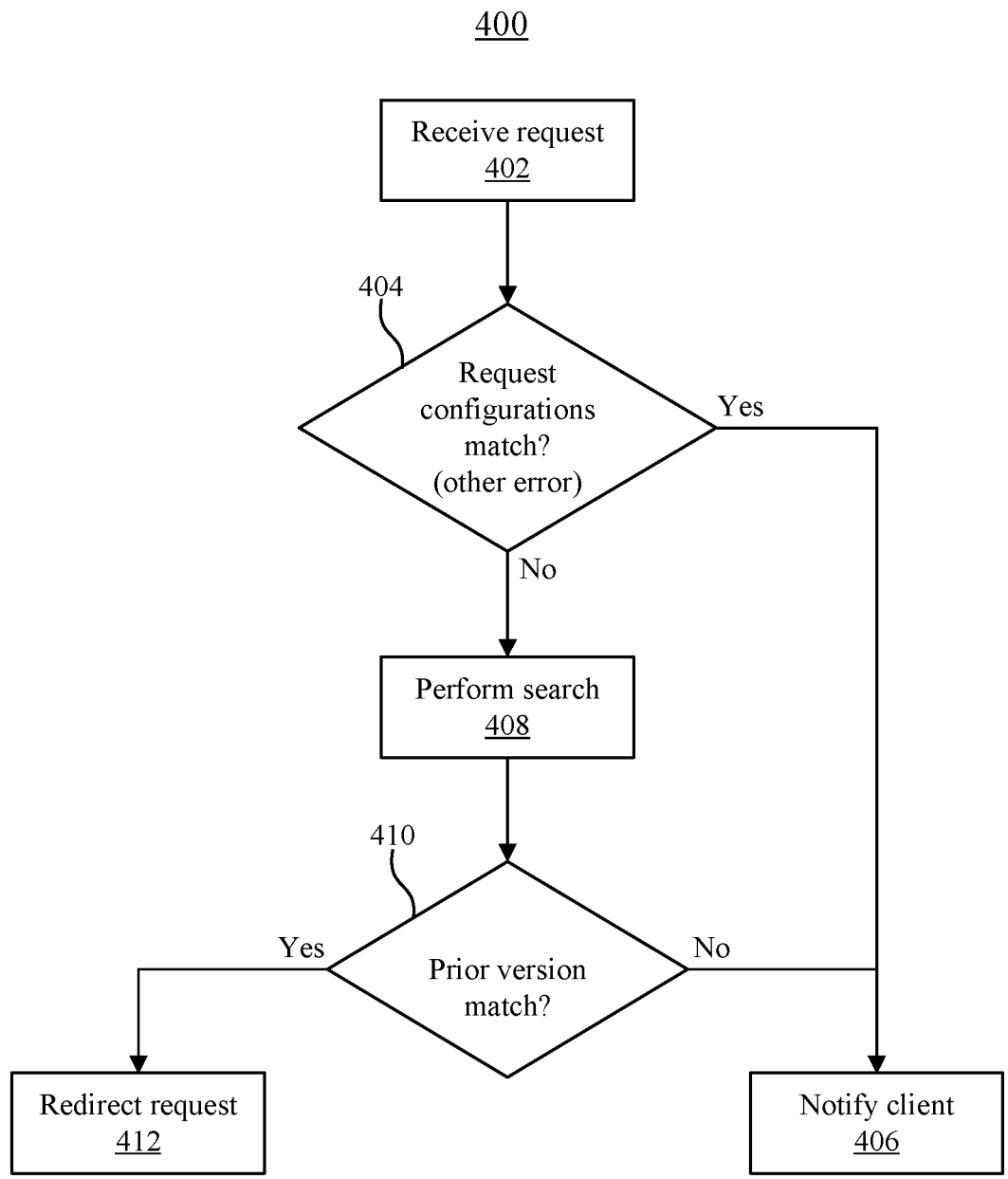
FIG. 4 is a flowchart of a method for determining, according to an embodiment, whether a received containerized service request is valid, but merely misdirected to a different version's container.

FIG. 4 is a flowchart of method 400 for determining, according to an embodiment, whether a received containerized service request is valid, but merely misdirected to a different version's container. Method 400 can be performed by a system the same or similar to the systems described with reference to FIGS. 1 and 2. The system at block 402 receives a containerized service request. If the containerized service request generates an error response from the host of the service, the system at block 404 determines whether the error is one other than a mismatch between the configuration of the received request and the required request configuration (e.g., incorrect API prefix). If the configurations match, the system determines that the error is due to a reason other than request configuration and, at block 406, notifies the error to a user or client who submitted the request. However, if the received request configuration does not match the required request configuration, then the error is due to the mismatch between the current request configuration and the required request configuration. If the error is due to a mismatch, then at block 408 the system searches for a configuration that maps to an earlier version of the containerized service and that matches the received request configuration. If at block 410, a configuration corresponding to the received request configuration is found, then at block 412 the system notifies a forwarder that redirects the received request by forwarding current request to a container of the earlier version of the containerized service. If that version has been scaled to zero, the system can rescale the version to satisfy the request. If at block 410, the system fails to successfully invoke the containerized service request, the client or user is notified at block 406.

Figure 5:
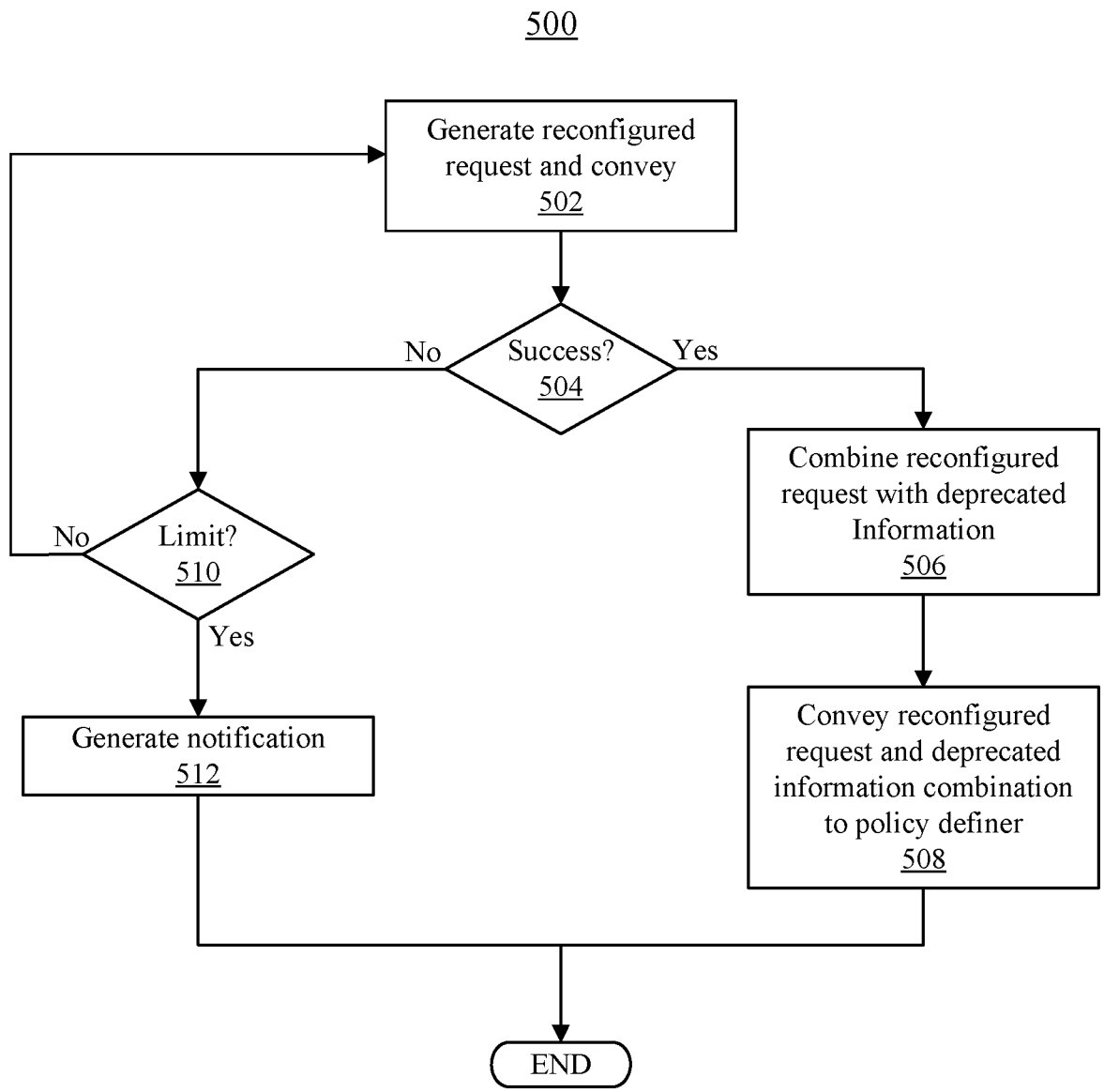
FIG. 5 is a flowchart of a method for forwarding current request for a containerized service to an earlier version of the containerized service according to an embodiment.

FIG. 5 is a flowchart of method 500 for forwarding, according to one embodiment, a current request for a containerized service to an earlier version of the containerized service, the earlier version mapped to a request configuration that matches the current request. Method 500 can be performed by a system the same or similar to the systems described with reference to FIGS. 1 and 2. The system at block 502 can generate a reconfigured request and convey the reconfigured request to a pod or container of an earlier version of the containerized service. For example, the reconfiguration can be generated by adding a revision version indicator (e.g., v1) in place of a different revision version indicator (e.g., v2), where the added revision version indicator corresponds to the pod or container of the earlier version of the containerized service. If at block 504 the reconfigured request successfully invokes the containerized service, the system at 506 can combine the reconfigured request with deprecated information and at block 508 convey both to a policy definer. The policy definer uses the information to establish a routing rule for future requests that match the client- or user-submitted request. If at block 504 the attempt to invoke the requested containerized service is unsuccessful, but as determined at block 510 a retry limit has not been reached, then the system generates another reconfigured request directed to an even earlier version of the containerized service. However, if at block 510 the retry limit has been reached, then the system at block 512 generates a notification to the user. The notification can instruct the user that the requested containerized service is handled by a differently configured containerized service request and that the user should consult the appropriate definition file before resubmitting a request.

Figure 6:
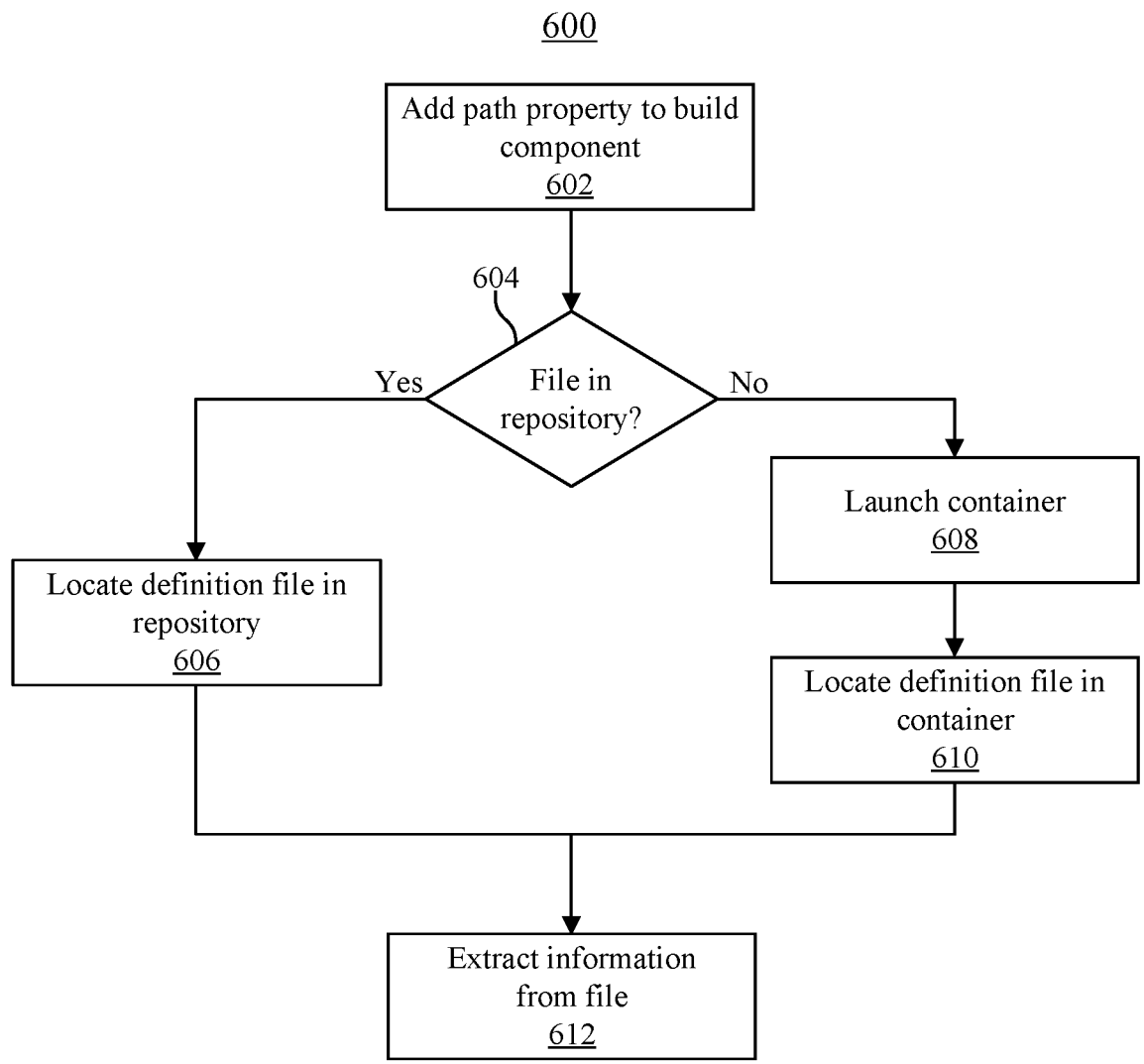
FIG. 6 is a flowchart of a method for building, according to an embodiment, a database that maps requests to containers configured and managed by a serverless platform

FIG. 6 is a flowchart of method 600 for building, according to one embodiment, a database that maps requests to containers that are configured and managed by a serverless platform. Method 600 can be performed by a system the same or similar to the systems described with reference to FIGS. 1 and 2. Illustratively, at block 602, the system adds a path property to the build component on a serverless platform. The system at block 604 determines whether an API definition file (e.g., Swagger definition file) with interface definition information (e.g., Swagger specification) exists in a repository. If the definition file is found in a repository, then at block 606 the system locates the definition file in the repository. Otherwise, if the definition file does not exist in a repository, the system at block 608 launches a container and at block 610 locates the definition file in the container. The system at block 612 extracts the interface definition information from the definition file and uses the information to specify a version-specific service request. This facilitates the system in building a database mapping containerized service requests to specific versions (or revision) of a service which the build component containerizes. Such a mapping is used to determine a match between a current, albeit misdirected, client or user request and a prior version of a containerized service.

It is understood that although this disclosure includes a detailed description on cloud computing, implementations of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 7:
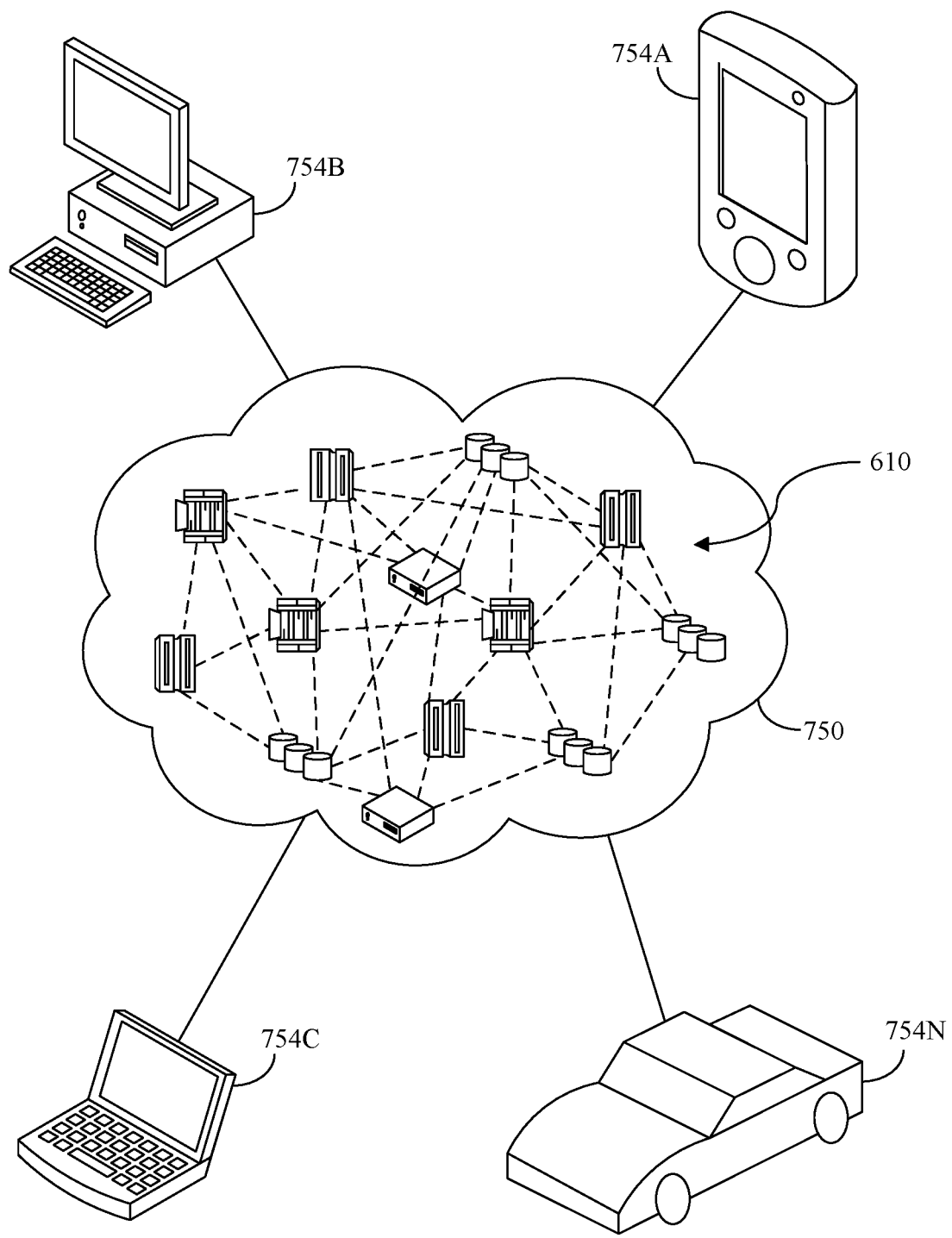
FIG. 7 depicts a cloud computing environment according to an embodiment.

Referring now to FIG. 7, illustrative cloud computing environment 700 is depicted. As shown, cloud computing environment 700 includes one or more cloud computing nodes 710 with which local computing devices used by cloud consumers, such as, for example, personal digital assistant (PDA) or cellular telephone 740A, desktop computer 740B, laptop computer 740C, and/or automobile computer system 740N may communicate. Nodes 710 may communicate with one another. They may be grouped (not shown) physically or virtually, in one or more networks, such as Private, Community, Public, or Hybrid clouds as described hereinabove, or a combination thereof. This allows cloud computing environment 700 to offer infrastructure, platforms and/or software as services for which a cloud consumer does not need to maintain resources on a local computing device. It is understood that the types of computing devices 740A-740N shown in FIG. 7 are intended to be illustrative only and that computing nodes 710 and cloud computing environment 700 can communicate with any type of computerized device over any type of network and/or network addressable connection (e.g., using a web browser).

Figure 8:
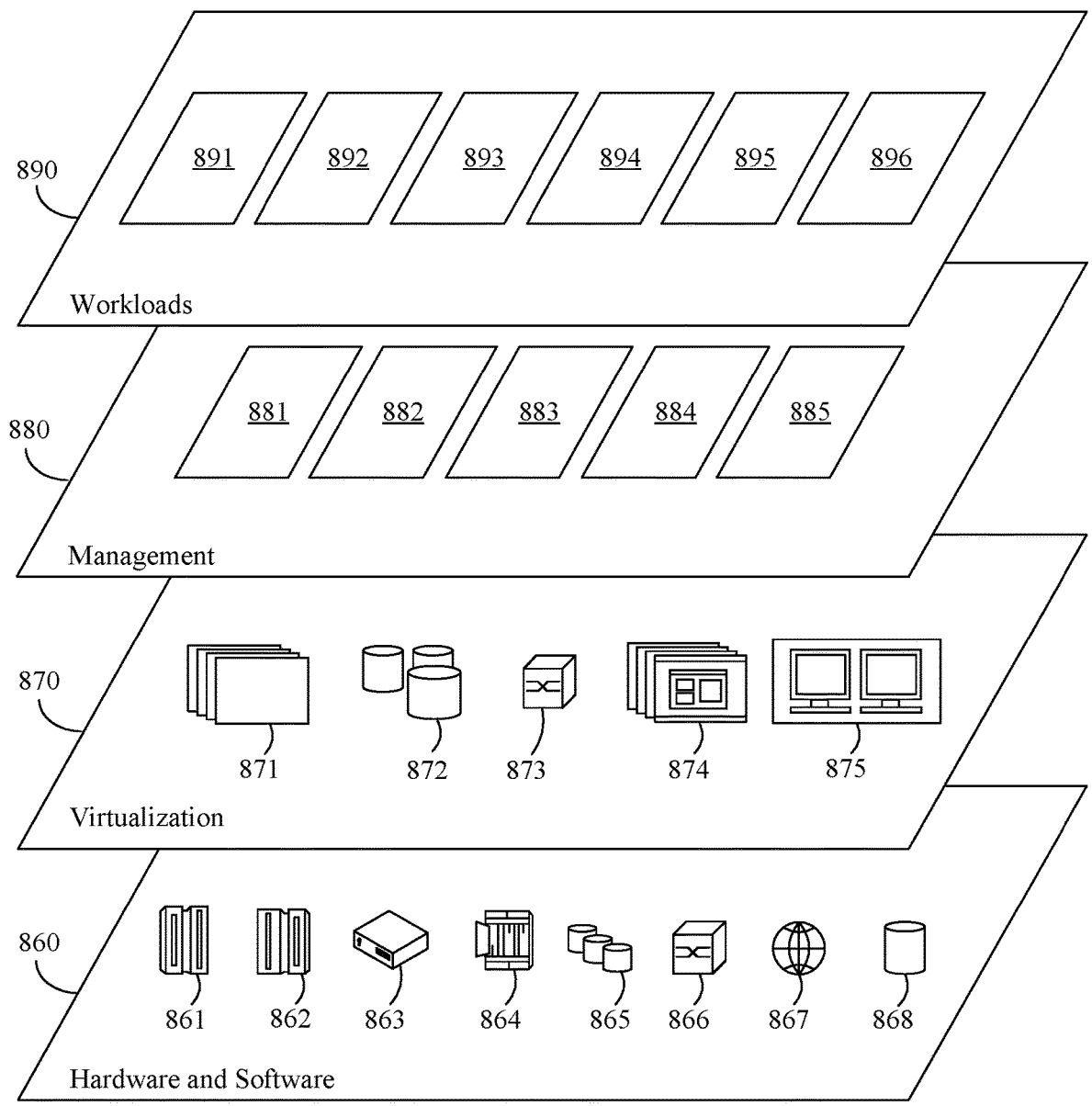
FIG. 8 depicts abstraction model layers according to an embodiment.

Referring now to FIG. 8, a set of functional abstraction layers provided by cloud computing environment 700 (FIG. 7) is shown. It should be understood that the components, layers, and functions shown in FIG. 8 are intended to be illustrative only and embodiments of the invention are not limited thereto. As depicted, the following layers and corresponding functions are provided:

Hardware and software layer 860 includes hardware and software components. Examples of hardware components include: mainframes 861; RISC (Reduced Instruction Set Computer) architecture based servers 862; servers 863; blade servers 864; storage devices 865; and networks and networking components 866. In some embodiments, software components include network application server software 867 and database software 868.

Virtualization layer 870 provides an abstraction layer from which the following examples of virtual entities may be provided: virtual servers 871; virtual storage 872; virtual networks 873, including virtual private networks; virtual applications and operating systems 874; and virtual clients 875.

In one example, management layer 880 may provide the functions described below. Resource provisioning 881 provides dynamic procurement of computing resources and other resources that are utilized to perform tasks within the cloud computing environment. Metering and Pricing 882 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 883 provides access to the cloud computing environment for consumers and system administrators. Service level management 884 provides cloud computing resource allocation and management such that required service levels are met. Service Level Agreement (SLA) planning and fulfillment 885 provide pre-arrangement for, and procurement of, cloud computing resources for which a future requirement is anticipated in accordance with an SLA. Workloads layer 890 provides examples of functionality for which the cloud computing environment may be utilized. Examples of workloads and functions which may be provided from this layer include: mapping and navigation 891; software development and lifecycle management 892; virtual classroom education delivery 893; data analytics processing 894; transaction processing 895; and serverless platform request routing system 896 capable of performing the operations described in this disclosure.

Figure 9:
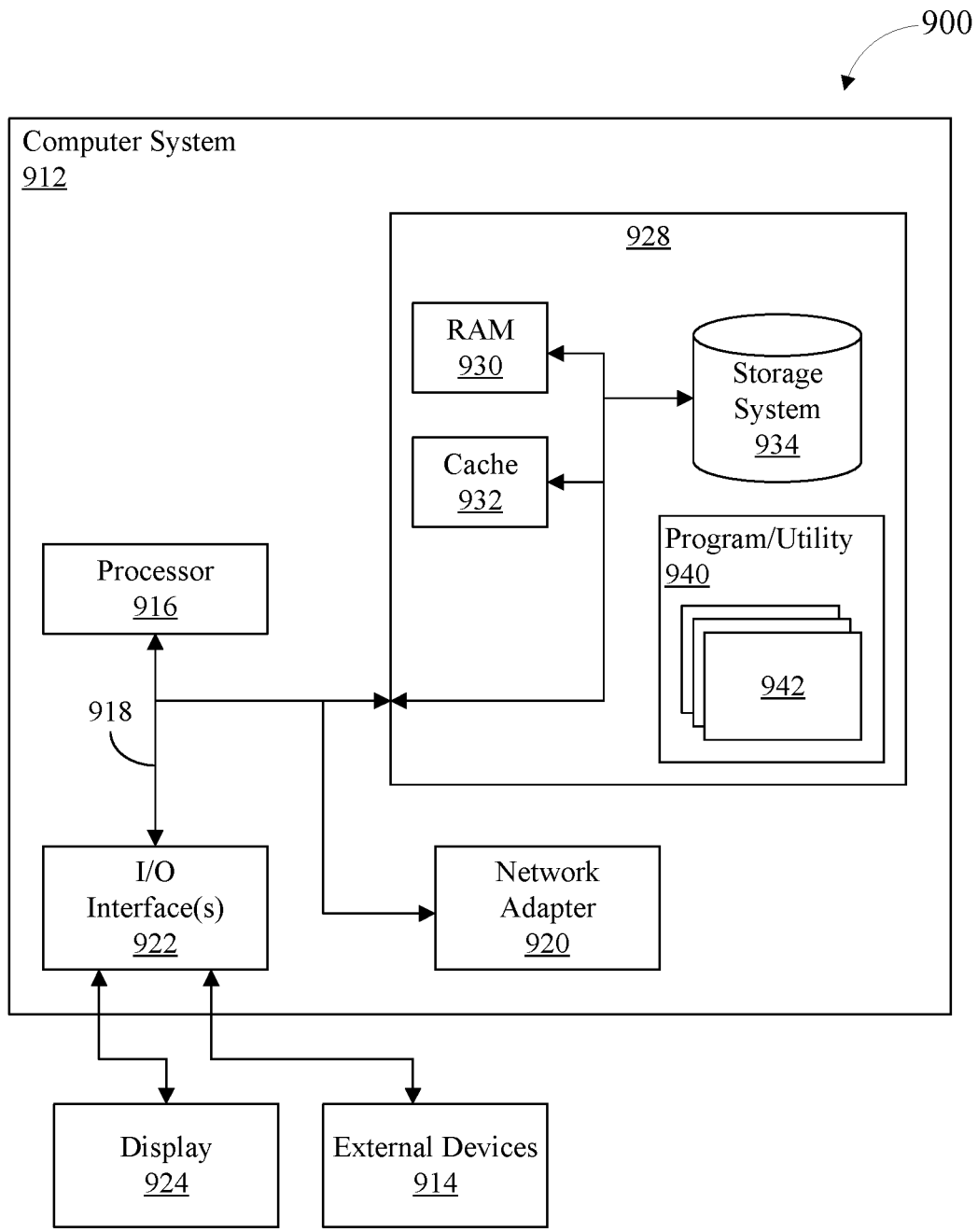
FIG. 9 depicts a cloud computing node according to an embodiment.

FIG. 9 illustrates a schematic of an example of a computing node 900. In one or more embodiments, computing node 900 is an example of a suitable cloud computing node. Computing node 900 is not intended to suggest any limitation as to the scope of use or functionality of embodiments of the invention described herein. Computing node 900 is capable of performing any of the functionality described within this disclosure.

Computing node 900 includes a computer system 912, which is operational with numerous other general-purpose or special-purpose computing system environments or configurations. Examples of well-known computing systems, environments, and/or configurations that may be suitable for use with computer system 912 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system 912 may be described in the general context of computer system-executable instructions, such as program modules, being executed by a computer system. Generally, program modules may include routines, programs, objects, components, logic, data structures, and so on that perform particular tasks or implement particular abstract data types. Computer system 912 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 9, computer system 912 is shown in the form of a general-purpose computing device. The components of computer system 912 may include, but are not limited to, one or more processors 916, a memory 928, and a bus 918 that couples various system components including memory 928 to processor 916. As defined herein, "processor" means at least one hardware circuit configured to carry out instructions. The hardware circuit may be an integrated circuit. Examples of a processor include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, and a controller.

Bus 918 represents one or more of any of several types of bus structures, including a memory bus or memory controller, a peripheral bus, an accelerated graphics port, and a processor or local bus using any of a variety of bus architectures. By way of example only, and not limitation, such architectures include Industry Standard Architecture (ISA) bus, Micro Channel Architecture (MCA) bus, Enhanced ISA (EISA) bus, Video Electronics Standards Association (VESA) local bus, Peripheral Component Interconnect (PCI) bus, and PCI Express (PCIe) bus.

Computer system 912 typically includes a variety of computer system-readable media. Such media may be any available media that is accessible by computer system 912, and may include both volatile and non-volatile media, removable and non-removable media.

Memory 928 may include computer system readable media in the form of volatile memory, such as random-access memory (RAM) 930 and/or cache memory 932. Computer system 912 may further include other removable/non-removable, volatile/non-volatile computer system storage media. By way of example, storage system 934 can be provided for reading from and writing to a non-removable, non-volatile magnetic media and/or solid-state drive(s) (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 918 by one or more data media interfaces. As will be further depicted and described below, memory 928 may include at least one program product having a set (e.g., at least one) of program modules that are configured to carry out the functions of embodiments of the invention.

Program/utility 940, having a set (at least one) of program modules 942, may be stored in memory 928 by way of example, and not limitation, as well as an operating system, one or more application programs, other program modules, and program data. Each of the operating system, one or more application programs, other program modules, and program data or some combination thereof, may include an implementation of a networking environment. Program modules 942 generally carry out the functions and/or methodologies of embodiments of the invention as described herein. For example, one or more of the program modules may include serverless platform request routing system 896 (FIG. 8) or portions thereof.

Program/utility 940 is executable by processor 916. Program/utility 940 and any data items used, generated, and/or operated upon by computer system 912 are functional data structures that impart functionality when employed by computer system 912. As defined within this disclosure, a "data structure" is a physical implementation of a data model's organization of data within a physical memory. As such, a data structure is formed of specific electrical or magnetic structural elements in a memory. A data structure imposes physical organization on the data stored in the memory as used by an application program executed using a processor.

Computer system 912 may also communicate with one or more external devices 914 such as a keyboard, a pointing device, a display 924, etc.; one or more devices that enable a user to interact with computer system 912; and/or any devices (e.g., network card, modem, etc.) that enable computer system 912 to communicate with one or more other computing devices. Such communication can occur via input/output (I/O) interfaces 922. Still, computer system 912 can communicate with one or more networks such as a local area network (LAN), a general wide area network (WAN), and/or a public network (e.g., the Internet) via network adapter 920. As depicted, network adapter 920 communicates with the other components of computer system 912 via bus 918. It should be understood that although not shown, other hardware and/or software components could be used in conjunction with computer system 912. Examples, include, but are not limited to: microcode, device drivers, redundant processing units, external disk drive arrays, RAID systems, tape drives, and data archival storage systems, etc.

While computing node 900 is used to illustrate an example of a cloud computing node, it should be appreciated that a computer system using an architecture the same as or similar to that described in connection with FIG. 9 may be used in a non-cloud computing implementation to perform the various operations described herein. In this regard, the example embodiments described herein are not intended to be limited to a cloud computing environment. Computing node 900 is an example of a data processing system. As defined herein, "data processing system" means one or more hardware systems configured to process data, each hardware system including at least one processor programmed to initiate operations and memory.

Computing node 900 is an example of computer hardware. Computing node 900 may include fewer components than shown or additional components not illustrated in FIG. 9 depending upon the particular type of device and/or system that is implemented. The particular operating system and/or application(s) included may vary according to device and/or system type as may the types of I/O devices included. Further, one or more of the illustrative components may be incorporated into, or otherwise form a portion of, another component. For example, a processor may include at least some memory.

Computing node 900 is also an example of a server. As defined herein, "server" means a data processing system configured to share services with one or more other data processing systems. As defined herein, "client device" means a data processing system that requests shared services from a server, and with which a user directly interacts. Examples of a client device include, but are not limited to, a workstation, a desktop computer, a computer terminal, a mobile computer, a laptop computer, a netbook computer, a tablet computer, a smart phone, a personal digital assistant, a smart watch, smart glasses, a gaming device, a set-top box, a smart television and the like. In one or more embodiments, the various user devices described herein may be client devices. Network infrastructure, such as routers, firewalls, switches, access points and the like, are not client devices as the term "client device" is defined herein.

The terminology used herein is for the purpose of describing particular embodiments only and is not intended to be limiting. Notwithstanding, several definitions that apply throughout this document now will be presented.

As defined herein, the singular forms "a," "an," and "the" include the plural forms as well, unless the context clearly indicates otherwise.

As defined herein, "another" means at least a second or more.

As defined herein, "at least one," "one or more," and "and/or," are open-ended expressions that are both conjunctive and disjunctive in operation unless explicitly stated otherwise. For example, each of the expressions "at least one of A, B and C," "at least one of A, B, or C," "one or more of A, B, and C," "one or more of A, B, or C," and "A, B, and/or C" means A alone, B alone, C alone, A and B together, A and C together, B and C together, or A, B and C together.

As defined herein, "automatically" means without user intervention.

As defined herein, "includes," "including," "comprises," and/or "comprising," specify the presence of stated features, integers, steps, operations, elements, and/or components, but do not preclude the presence or addition of one or more other features, integers, steps, operations, elements, components, and/or groups thereof.

As defined herein, "if" means "when" or "upon" or "in response to" or "responsive to," depending upon the context. Thus, the phrase "if it is determined" or "if [a stated condition or event] is detected" may be construed to mean "upon determining" or "in response to determining" or "upon detecting [the stated condition or event]" or "in response to detecting [the stated condition or event]" or "responsive to detecting [the stated condition or event]" depending on the context.

As defined herein, "one embodiment," "an embodiment," "in one or more embodiments," "in particular embodiments," or similar language mean that a particular feature, structure, or characteristic described in connection with the embodiment is included in at least one embodiment described within this disclosure. Thus, appearances of the aforementioned phrases and/or similar language throughout this disclosure may, but do not necessarily, all refer to the same embodiment.

As defined herein, "output" means storing in physical memory elements, e.g., devices, writing to display or other peripheral output device, sending or transmitting to another system, exporting, or the like.

As defined herein, the terms "responsive to" and "in response to" mean responding or reacting readily to an action or event. Thus, if a second action is performed "responsive to" a first action, there is a causal relationship between an occurrence of the first action and an occurrence of the second action. The term "responsive to" indicates the causal relationship as well.

As defined herein, term "substantially" means that the recited characteristic, parameter, or value need not be achieved exactly, but that deviations or variations, including for example, tolerances, measurement error, measurement accuracy limitations, and other factors known to those of skill in the art, may occur in amounts that do not preclude the effect the characteristic was intended to provide.

As defined herein, the terms "user" and "client" refer to a human being.

The terms first, second, etc. may be used herein to describe various elements. These elements should not be limited by these terms, as these terms are only used to distinguish one element from another unless stated otherwise or the context clearly indicates otherwise.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowcharts and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration and are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, comprising:
    responsive to receiving on a serverless platform a request for a containerized service and detecting a potential request failure, searching a database with computer hardware, the database mapping version-specific requests to a plurality of containers configured and managed by the serverless platform; and
    redirecting the request to a container containing a prior version of the containerized service requested in response to determining that the container maps to a version-specific request that matches the request received, wherein
    the detecting comprises:
    determining that a configuration of the request does not match a configuration specified for a current version of the containerized service, and
    updating a policy for redirecting of all future request that match the version-specific request in response to the request being successfully invoked.

2. The method of claim 1, further comprising generating and electronically storing a routing rule that redirects future requests matching the request received to the container containing the prior version of the containerized service.

3. The method of claim 1, wherein
    the redirecting comprises generating a reconfigured request different from the request received, the reconfigured request corresponding to the container containing the prior version of the containerized service requested.

4. The method of claim 3, wherein
    the generating comprises adding an earlier revision version indicator to a header of the request in response to failing to invoke the containerized service requested using a latter revision version indicator.

5. The method of claim 1, further comprising adding a path property to a build component of the serverless platform when creating a new version of the containerized service, wherein
    the path property is used to locate interface definition information for mapping a newly configured request to the new version of the containerized service.

6. The method of claim 5, further comprising extracting the interface definition information from an application programming interface (API) definition file in response to locating the API definition file stored in a repository or extracting the interface definition information from a container launched from a container image.

7. A system, comprising:
    a processor configured to initiate operations including:
    responsive to receiving on a serverless platform a request for a containerized service and detecting a potential request failure, searching a database with computer hardware, the database mapping version-specific requests to a plurality of containers configured and managed by the serverless platform; and
    redirecting the request to a container containing a prior version of the containerized service requested in response to determining that the container maps to a version-specific request that matches the request received, wherein
    the detecting comprises:
    determining that a configuration of the request does not match a configuration specified for a current version of the containerized service, and
    updating a policy for redirecting of all future request that match the version-specific request in response to the request being successfully invoked.

8. The system of claim 7, wherein
    the processor is configured to initiate operations further comprising generating and electronically storing a routing rule that redirects future requests matching the request received to the container containing the prior version of the containerized service.

9. The system of claim 7, wherein
the redirecting comprises generating a reconfigured request different from the request received, the reconfigured request corresponding to the container containing the prior version of the containerized service requested.

10. The system of claim 9, wherein
the generating comprises adding an earlier revision version indicator to a header of the request in response to failing to invoke the containerized service requested using a latter revision version indicator and determining that an attempt to redirect the request using the revision version indicator does not exceed a retry limit.

11. The system of claim 7, wherein
the processor is configured to initiate operations further comprising adding a path property to a build component of the serverless platform when creating a new version of the containerized service, wherein
the path property is used to locate interface definition information for mapping a newly configured request to the new version of the containerized service.

12. The system of claim 11, wherein
the processor is configured to initiate operations further comprising extracting the interface definition information from an application programming interface (API) definition file in response to locating the API definition file stored in a repository or extracting the interface definition information from a container launched from a container image.

13. A computer program product, the computer program product comprising:
one or more non-transitory computer-readable storage media and program instructions collectively stored on the one or more non-transitory computer-readable storage media, the program instructions executable by a processor to cause the processor to initiate operations including:
responsive to receiving on a serverless platform a request for a containerized service and detecting a potential request failure, searching a database with computer hardware, the database mapping version-specific requests to a plurality of containers configured and managed by the serverless platform; and
redirecting the request to a container containing a prior version of the containerized service requested in response to determining that the container maps to a version-specific request that matches the request received, wherein
the detecting comprises:
determining that a configuration of the request does not match a configuration specified for a current version of the containerized service, and
updating a policy for redirecting of all future request that match the version-specific request in response to the request being successfully invoked.

14. The computer program product of claim 13, wherein
the processor is configured to initiate operations further comprising generating and electronically storing a routing rule that redirects future requests matching the request received to the container containing the prior version of the containerized service.

15. The computer program product of claim 13, wherein
the redirecting comprises generating a reconfigured request different from the request received, the reconfigured request corresponding to the container containing the prior version of the containerized service requested.

16. The computer program product of claim 15, wherein
the generating comprises adding an earlier revision version indicator to a header of the request in response to failing to invoke the containerized service requested using a latter revision version indicator and determining that an attempt to redirect the request using the revision version indicator does not exceed a retry limit.

17. The computer program product of claim 13, wherein
the processor is configured to initiate operations further comprising adding a path property to a build component of the serverless platform when creating a new version of the containerized service, wherein
the path property is used to locate interface definition information for mapping a newly configured request to the new version of the containerized service.

18. The computer program product of claim 17, wherein
the program instructions are executable by the processor to cause the processor to initiate operations further comprising extracting the interface definition information from an application programming interface (API) definition file in response to locating the API definition file stored in a repository or extracting the interface definition information from a container launched from a container image.

* * * * *